United States Patent
Thomas (10) Patent No.: US 10,426,137 B2
(45) Date of Patent: Oct. 1, 2019

(54) ANIMAL TROUGH

(71) Applicant: Patricia Thomas, Middleburg, VA (US)

(72) Inventor: Patricia Thomas, Middleburg, VA (US)

(*) Notice: Subject to any disclaimer, the term of this patent is extended or adjusted under 35 U.S.C. 154(b) by 707 days.

(21) Appl. No.: 15/079,143

(22) Filed: Mar. 24, 2016

(65) Prior Publication Data

US 2016/0286756 A1    Oct. 6, 2016

Related U.S. Application Data (60) Provisional application No. 62/139,989, filed on Mar. 30, 2015.

(51) Int. Cl.
*A01K 7/00* (2006.01)
*A01K 7/02* (2006.01)

(52) U.S. Cl.
CPC .............. *A01K 7/027* (2013.01); *A01K 7/00* (2013.01); *A01K 7/005* (2013.01)

(58) Field of Classification Search
CPC .. A01K 5/0114; A01K 5/0128; A01K 5/0135; A01K 7/027; A01K 7/00; A01K 5/01; A01K 5/0142; A01K 7/005; A47G 23/04; A47J 41/00; A47J 41/0072
USPC ...... 119/74, 61.5, 73, 61.56, 51.5, 61.52, 72
See application file for complete search history.

(56) References Cited

U.S. PATENT DOCUMENTS

| | | | | |
|---|---|---|---|---|
| 587,559 A | * | 8/1897 | Riley | E03C 1/264 |
| | | | | 4/289 |
| 2,612,138 A | | 9/1952 | Lindemann | |
| 2,963,003 A | * | 12/1960 | Oberg | A01K 1/0114 |
| | | | | 119/166 |
| 2,971,493 A | * | 2/1961 | Robb | A01K 1/0107 |
| | | | | 119/166 |
| 3,498,268 A | * | 3/1970 | Langevin | A01K 5/0114 |
| | | | | 119/61.54 |
| 3,745,977 A | * | 7/1973 | Martin | A01K 7/04 |
| | | | | 119/73 |
| 3,749,063 A | * | 7/1973 | Buffum | A01K 5/0135 |
| | | | | 119/61.56 |
| 3,776,193 A | * | 12/1973 | Post, Sr. | A01K 5/0114 |
| | | | | 119/51.5 |
| 4,320,721 A | * | 3/1982 | Silcox | A01K 7/027 |
| | | | | 119/73 |
| 4,561,384 A | * | 12/1985 | Liff | A01K 7/027 |
| | | | | 119/73 |
| 4,615,300 A | * | 10/1986 | McDonough | A01K 1/0114 |
| | | | | 119/167 |
| 4,691,664 A | * | 9/1987 | Crowell | A01K 7/00 |
| | | | | 119/61.52 |

(Continued)

*Primary Examiner* — Yvonne R Abbott-Lewis
(74) *Attorney, Agent, or Firm* — Edell, Shapiro & Finnan, LLC (57) ABSTRACT

An improved animal trough includes an outer wall, an inner wall, a receptacle configured to receive a first fluid, and a housing separated from the receptacle. The receptacle is substantially smooth in order to prevent or discourage the growth of algae or the buildup or dirt and grime. The housing may include a ballast compartment configured to receive a second fluid and the trough may include a heating element configured to heat both the first and second fluid. The trough may also include a sieve configured to remove debris from the receptacle.

18 Claims, 7 Drawing Sheets

(56) References Cited

U.S. PATENT DOCUMENTS

| | | | | |
|---|---|---|---|---|
| 4,708,091 A | * | 11/1987 | Schafer | A01K 7/027 119/61.55 |
| 4,771,731 A | * | 9/1988 | Derx | A01K 1/0107 119/166 |
| 4,908,501 A | * | 3/1990 | Arnold, III | A01K 7/027 119/73 |
| 5,069,166 A | * | 12/1991 | Ahuna | A01K 5/0142 119/61.53 |
| 5,158,042 A | * | 10/1992 | Hammerslag | A01K 1/0114 119/165 |
| 5,209,184 A | * | 5/1993 | Sharkan | A01K 5/0114 119/61.56 |
| 5,377,621 A | * | 1/1995 | Camm | A01K 5/0114 119/61.54 |
| 5,406,909 A | * | 4/1995 | Wenstrand | A01K 5/01 119/72 |
| D362,089 S | * | 9/1995 | Moore | D30/129 |
| 5,579,946 A | * | 12/1996 | Rowan | A47G 23/04 220/592.27 |
| 5,598,811 A | * | 2/1997 | Merchant | A01K 1/0114 119/166 |
| 5,682,836 A | | 11/1997 | Gustin | |
| 5,709,168 A | * | 1/1998 | Walker | A01K 5/01 119/61.5 |
| 6,079,362 A | * | 6/2000 | Gholz | A01K 7/027 119/73 |
| 6,112,698 A | | 9/2000 | Zelinger | |
| 6,126,018 A | * | 10/2000 | Cone | A47J 43/284 210/469 |
| D466,655 S | * | 12/2002 | Zelinger | D30/129 |
| 6,498,323 B1 | * | 12/2002 | Robertson, Jr. | A47J 27/004 219/433 |
| 6,840,191 B2 | * | 1/2005 | Gaspary | A01K 5/0128 119/61.5 |
| 7,753,000 B1 | * | 7/2010 | Turner | A01K 5/01 119/57 |
| 7,913,648 B2 | * | 3/2011 | Maeda | A01K 7/027 119/51.5 |
| D659,296 S | * | 5/2012 | Anderson | D30/129 |
| 8,205,575 B2 | * | 6/2012 | Nicastle | A01K 7/00 119/72 |
| 8,342,350 B2 | * | 1/2013 | Jain | A01K 5/0114 220/23.89 |
| 8,674,268 B2 | * | 3/2014 | Clark, Jr. | A01K 7/027 119/73 |
| 9,832,971 B1 | * | 12/2017 | Hollander | A01K 5/0128 |
| 9,872,479 B2 | * | 1/2018 | Tharp | A01K 5/0114 |
| 2004/0231608 A1 | * | 11/2004 | Grace-Kellogg | A01K 7/00 119/72 |
| 2008/0314328 A1 | * | 12/2008 | Johnson | A01K 1/0114 119/166 |
| 2009/0169756 A1 | * | 7/2009 | Joosten | B44D 3/10 427/421.1 |
| 2015/0189856 A1 | * | 7/2015 | Alexander | A01K 7/02 119/74 |

\* cited by examiner

FIG. 6

ANIMAL TROUGH

CROSS-REFERENCE TO RELATED APPLICATION

This application claims priority to and is based on U.S. Patent Application No. 62/139,989, filed Mar. 30, 2015, entitled "Improved Animal Trough." The entire disclosure of this application is incorporated herein by reference in its entirety.

FIELD OF THE INVENTION

The present invention is directed toward a trough and, in particular, to a water trough for animals including improvements that may prevent buildup of grime, algae, and other such pollutants while also making the trough easier to clean.

BACKGROUND OF THE INVENTION

Water troughs and particularly water troughs for animals are well known and widely used with livestock, wildlife, and even larger companion animals. Often, water troughs are utilized when a natural water source, such as a stream or river, is not available or accessible for animals. Additionally, water troughs may be used with animals that are kept in enclosures, such as pens or stables. Regardless of the situation, water troughs are typically very large and, thus, are frequently installed or placed in a location that is convenient for the animals and left in that location for a long period of time. At the same time, since water troughs are typically large and unwieldy, manufacturers often produce water troughs, such as the prior art water trough 50 shown in FIG. 1, with features that reduce the costs of shipping and handling, but detract from the end use of the trough. For example, the trough 50 shown in FIG. 1 includes edges 55 and a rolled lip 56 to enable nesting, but these features detract from the trough's ability to provide a clean water source.

Figure 1:
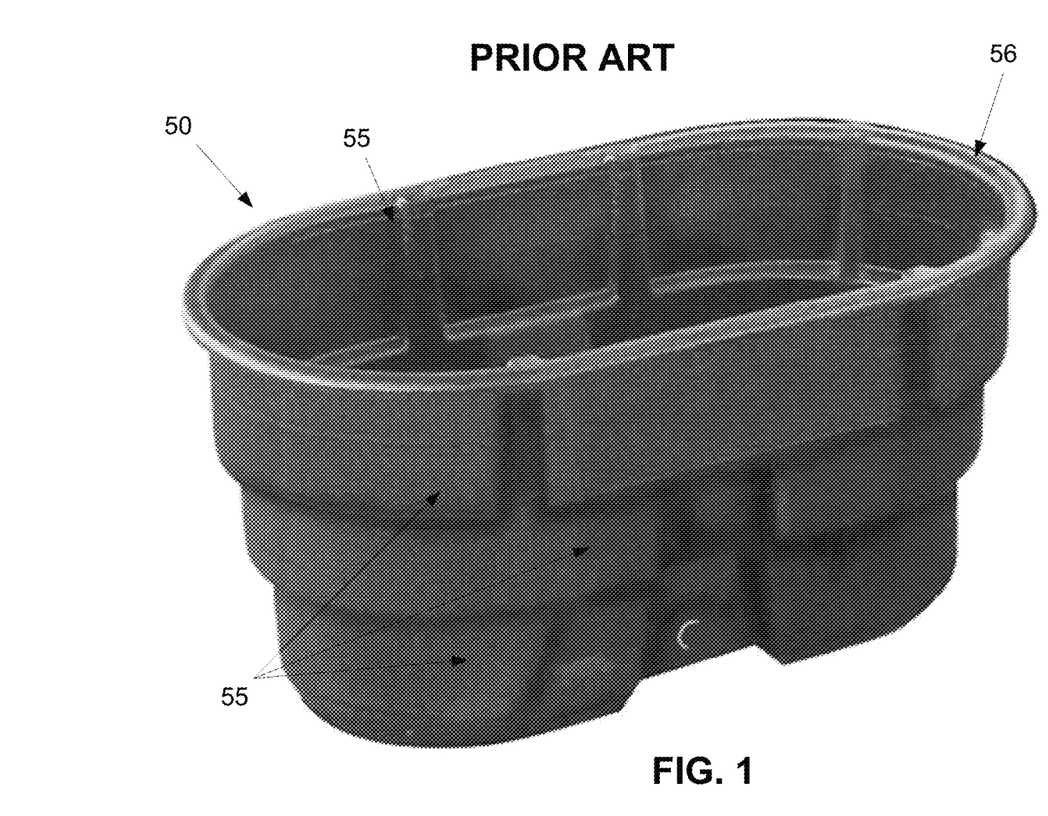
FIG. 1 shows a front perspective view of a prior art water trough.

Moreover, when water troughs with irregular features, such as edges 55 and rolled lip 56, are left outdoors for long periods of time, the irregular features provide a nesting area for wasps, bees, spiders, and other such dangerous insects, a breeding ground for algae and other harmful organisms, and enable the buildup of dirt and other grime. Moreover, the irregular edges are difficult to clean, even without insects and buildup.

Additionally, since water troughs are used with animals and exposed to the environment, debris may regularly collect within a trough. In fact, some animals, in particular equines, often play in, with, or paw the water in water troughs which may cause or enable debris to enter the trough. Sometimes an animal may even knock over a trough while playing with it, spilling the contents and enabling debris to be blown or kicked into the trough. Regardless of how debris enters a trough, the size and shape of a trough may make it difficult to remove the debris when the trough is upright and tipping the trough over to remove debris may waste resources. Moreover, if a trough is able to be tipped over, resources stored therein may be wasted and animals may be without a water source until a user notices the tipped trough. Additionally, a tipped trough may further enable microorganism growth, insect nesting, and dirt buildup within the trough.

In view of the foregoing, a water trough that is easy to clean and substantially limits or prevents the buildup of harmful organisms is desired. Additionally or alternatively, a water trough with increased stability is desired for both cleanliness and functionality.

SUMMARY OF THE INVENTION

An improved animal trough according to the present invention includes an inner wall with an inner surface and outer surface, an outer wall with an inner surface and outer surface, a compartment configured to removably receive a first fluid and formed between the inner surface of the inner wall and the inner surface of the outer wall, and a receptacle configured to receive a second fluid formed along the outer surface of the inner wall. The receptacle is smooth and the inner wall separates the compartment from the receptacle such that the first fluid is separated from the second fluid.

BRIEF DESCRIPTION OF THE DRAWINGS

FIGS. 5A and 5B each show a sectional view of an embodiment of the trough of FIG. 2 taken along line 5-5 of FIG. 2.
FIG. 5A shows a first example heating element installed in the trough and FIG. 5B shows a second example heating element installed in the trough.

DETAILED DESCRIPTION OF THE INVENTION

In accordance with the present invention, an improved trough is a water trough which substantially limits or prevents the growth of algae and other harmful microorganisms. Additionally or alternatively, an improved trough according the present invention is a trough with a built-in ballast compartment or section configured to maintain the trough in an upright position. In preferred embodiments, the ballast is hidden within a smooth outer surface, insofar as outer includes any surfaces that are exposed to a user or the elements, such that the outer surface of the trough is easy to clean and aesthetically pleasing. In fact, regardless of whether a ballast compartment or section is included in the present invention, embodiments of the improved water trough may include a smooth outer surface with limited crevices, corners, or other such spaces, such that the improved water trough discourages or prevents the growth of algae and the buildup of dirt and grime. Some embodiments of the improved water trough are even manufactured without any corners, seams, edges, or ledges included in the portion of the trough where water is disposed.

Referring generally to FIGS. 2-6, one embodiment of an improved water trough 100, or portions thereof, are shown. As can be seen, in some embodiments, the trough 100 includes a basin 102 and an insert 200. In embodiments which include an insert 200, the insert 200 preferably rests or nests within the basin 102 in a tight or friction fit in order to reduce the size of or any cracks or crevices, cover any ledges, or otherwise prevent any such features from being exposed. Preferably, the insert 200 is a sieve, filter, or strainer of some sort which may allow debris to be easily removed from the basin; however, in other embodiments the insert 200 may be or include any desirable feature or element. For example, the insert 200 could be a cover, pad, or lid of some sort, if desired. Regardless of the function of the insert 200, the basin 102, either alone or together with insert 200, is configured to receive, store, and provide liquids, goods, objects, materials, etc. to animals in a desirable location. Thus, although the trough 100 is frequently described herein as being used to provide water for animals, it is to be understood that water provision is simply an exemplary use and not the only way in which the trough 100 may be used.

Still referring generally to FIGS. 2-6, the shown embodiment of trough 100 is generally elliptical. However, it is to be understood that the trough may be any desirable shape. That being said, an elliptical or circular shape may be preferred in order to reduce the number cracks, crevices, seams, corners, etc. included in the trough and to facilitate handling. Similarly, while the shown embodiment is preferably manufactured from plastic, it is to be understood that trough 100, or portions thereof, may be manufactured from any desirable material. For example, in some embodiments, the insert 200 is manufactured from metal or stiffened plastic in order to ensure it holds its shape when removed and the basin 102 is manufactured from weatherproof plastic. Regardless of the material that the trough 100 is manufactured from, some embodiments of the trough 100 may include features to: enhance the balance of the trough 100; facilitate cleaning, transport, and/or handling; and/or enhance the cleanliness of liquids stored within the basin 102, as is described below in more detail.

Figure 2:
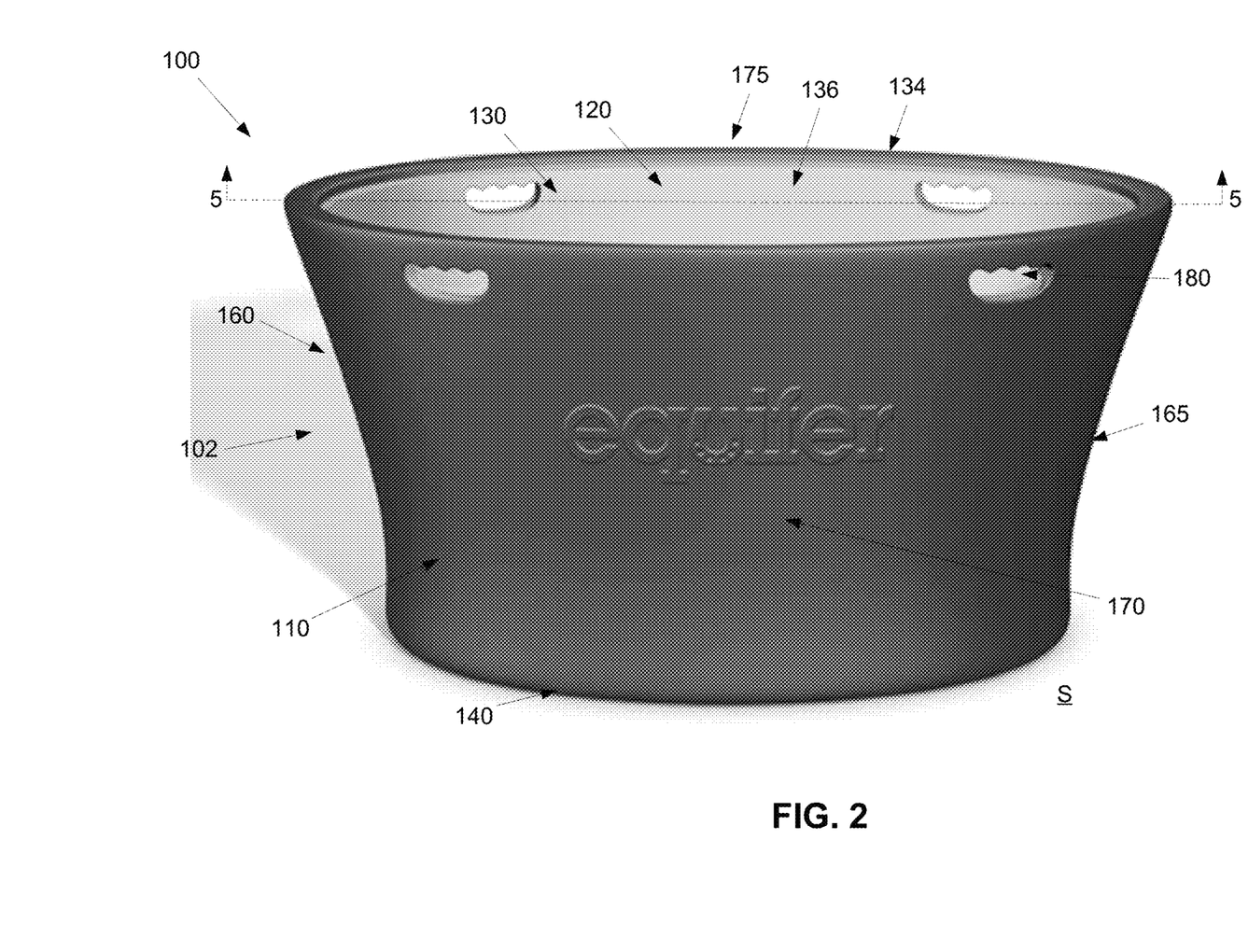
FIG. 2 shows a front perspective view of an embodiment of an improved trough according to the present invention.
Figure 5A:
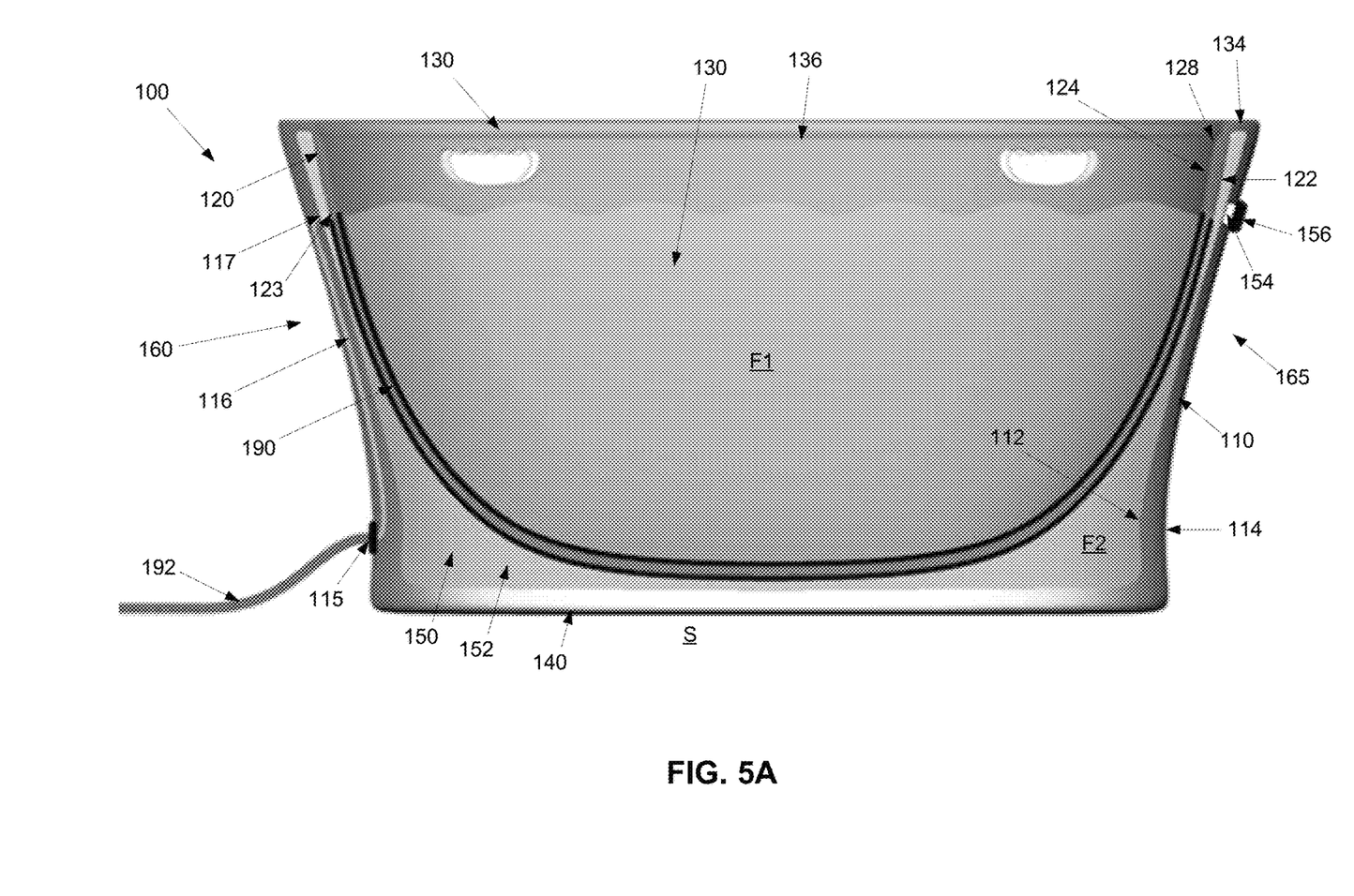
Figure 5B:
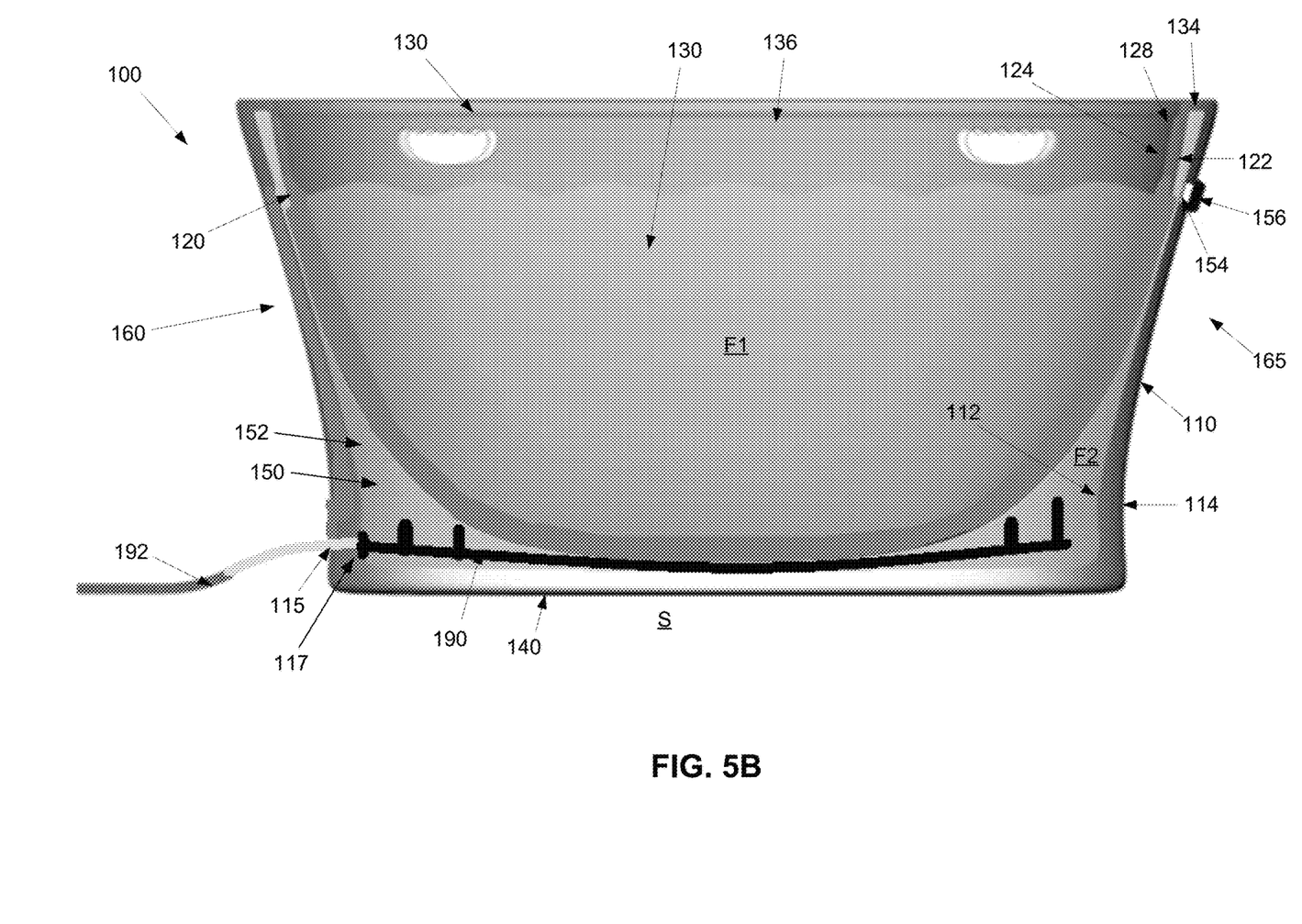

Now referring to FIG. 2, a basin 102 for a water trough 100 is shown without the insert 200 installed or placed therein. As can be seen, the basin 102 includes an outer wall 110 and an inner wall 120. In this embodiment, the outer wall 110 and inner wall 120 are each closed-loop walls that include a first side 170 and a second, opposite side 175 that each extend from a first end 160 to a second end 165. The basin also includes a bottom 140 that extends between the first side 170 and the second side 175 of the outer wall 110 and a top 134 that extends between the inner wall 120 and the outer wall 110 in order to couple inner wall 120 and outer wall 110 together. As can be seen best in FIG. 5, together, the bottom wall 140, the top wall 134, the outer wall 110, and inner wall 120 provide a housing 150 configured to store various internal elements or features of trough 100, such as a ballast compartment or a heating element, that may be included in various embodiments.

Still referring to FIG. 2, in this embodiment, the outer wall 120 and inner wall 110 are each substantially curved in order to provide a basin 102 that is substantially elliptical. More specifically, in this embodiment, the outer wall 110 is substantially annular and extends around the inner wall 120 and the bottom 140 in order to provide a smooth outer surface. By comparison, the inner wall 120 is shaped as a substantially inverted dome, hemisphere, or other such bowl-shape, such that the inner wall 120 may provide a receptacle 130 with an open top 136 within the outer wall 110. Thus, as can be seen, the receptacle 130 is configured to receive and store materials, preferably water or other similar liquids, in a manner which is easily accessible for a user (e.g., a cleaner or animal). As mentioned above, in other embodiments, inner wall 120 and outer wall 110 may be shaped as desired provided that the receptacle 130 is configured to receive and store desired materials. Indeed, in some embodiments, such as the embodiment shown in FIG. 1, a lower portion of outer wall 110, insofar as lower simply denotes the portion disposed adjacent or proximate the bottom 140, is flared, widened, or otherwise shaped (e.g., has a constant width) to form a wide base configured to stably support the basin 102 on a support surface S. By comparison, a top portion of outer wall 110 is tapered.

As can be seen in FIG. 2, the receptacle 130 of the trough 100 is substantially smooth, insofar as smooth means the receptacle 130, or at least the portion of the receptacle 130 in contact with liquid disposed therein, does not include any crevices, cracks, seams, or indentations. Consequently, the receptacle 130 does not provide any areas that might encourage or stimulate algae growth or dirt buildup. That being said, in some embodiments, outer surfaces (e.g., the outer surface of outer wall 110) of the trough 100 may include folds, corrugations, or other such features in order to increase the structural integrity of the trough. However, theses features are not provided in locations that contact water or other fluids disposed in the receptacle 130.

In order to further discourage algae growth, the receptacle may be manufactured from, be painted with, or otherwise be colored with a light colored material. In some embodiments, the light coloring may only be included on portions of the receptacle 130 in contact with a liquid disposed in the receptacle 130. By comparison with black or darker troughs, the light color may discourage algae growth. The light color may also maintain any liquids stored in the trough 100 at a cooler temperature compared to black or darker troughs, which may inhibit bacteria growth from organic matter that may be deposited in the trough 100 by animals during use. Consequently, in at least some embodiments, the receptacle 130 and/or the inner wall 120 (which forms the receptacle 130) may be molded from a single piece of light-colored plastic. Alternatively, only the portion of the receptacle 130 that is in contact with water or other such fluids may be molded from light-colored plastics since this may, in some instances, reduce the costs of manufacturing.

Figure 3:
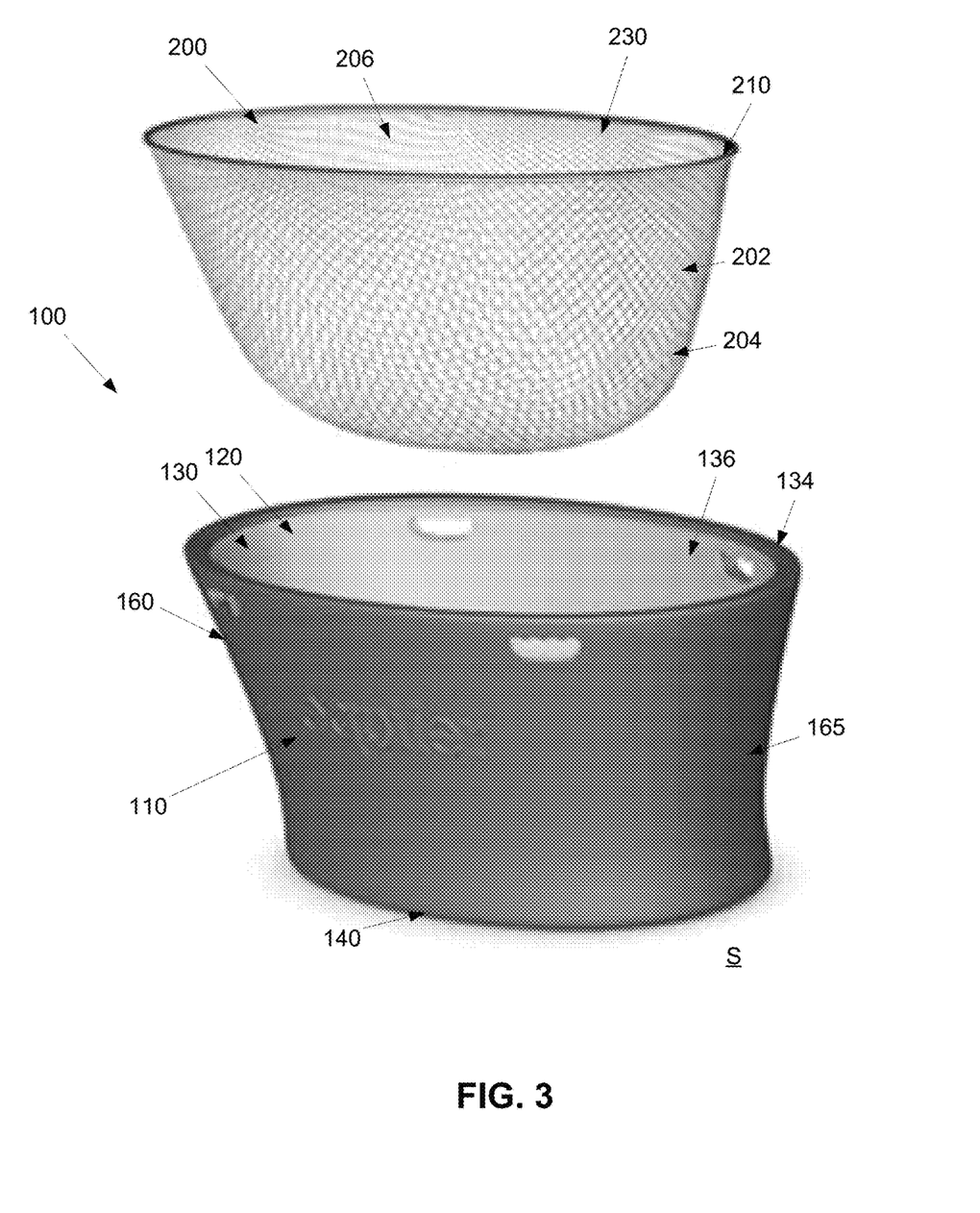
FIG. 3 shows a side perspective view of the trough of FIG. 2 including an insert configured as a sieve.

Now turning to FIG. 3, an insert 200 is shown separated from the basin 102, perhaps prior to insertion or installation or subsequent to removal. In this embodiment, the insert 200 is configured as a sieve or colander that may assist a user in removing debris that has been introduced the receptacle 130. Regardless of the use, the insert 200 includes a wall 202 with an outer surface 204 and an inner surface 206. Preferably, the outer surface 204 is shaped to substantially nest or conform to the inner wall 120 of the basin 102 such that the insert 200 sits flush against the inner wall 120 when inserted or installed within the basin 102. In some embodiments, such as the embodiment shown in FIG. 3, the insert 200 may also include an upper edge 210 configured to rest on a ledge or lip 128 included in the basin 102 (see FIG. 4). In the illustrated embodiment, the upper edge 210 protrudes slightly beyond the outer periphery of the wall 202, such that it may sit on an upper lip 128 if desired. By comparison, the inner surface 206 of the insert 200 is configured to provide a receptacle 230. Preferably, the inner surface 206 and outer surface 204 of the insert wall 202 are substantially parallel, such that the insert receptacle 230 substantially matches or conforms to the configuration of the basin receptacle 130.

Figure 4:
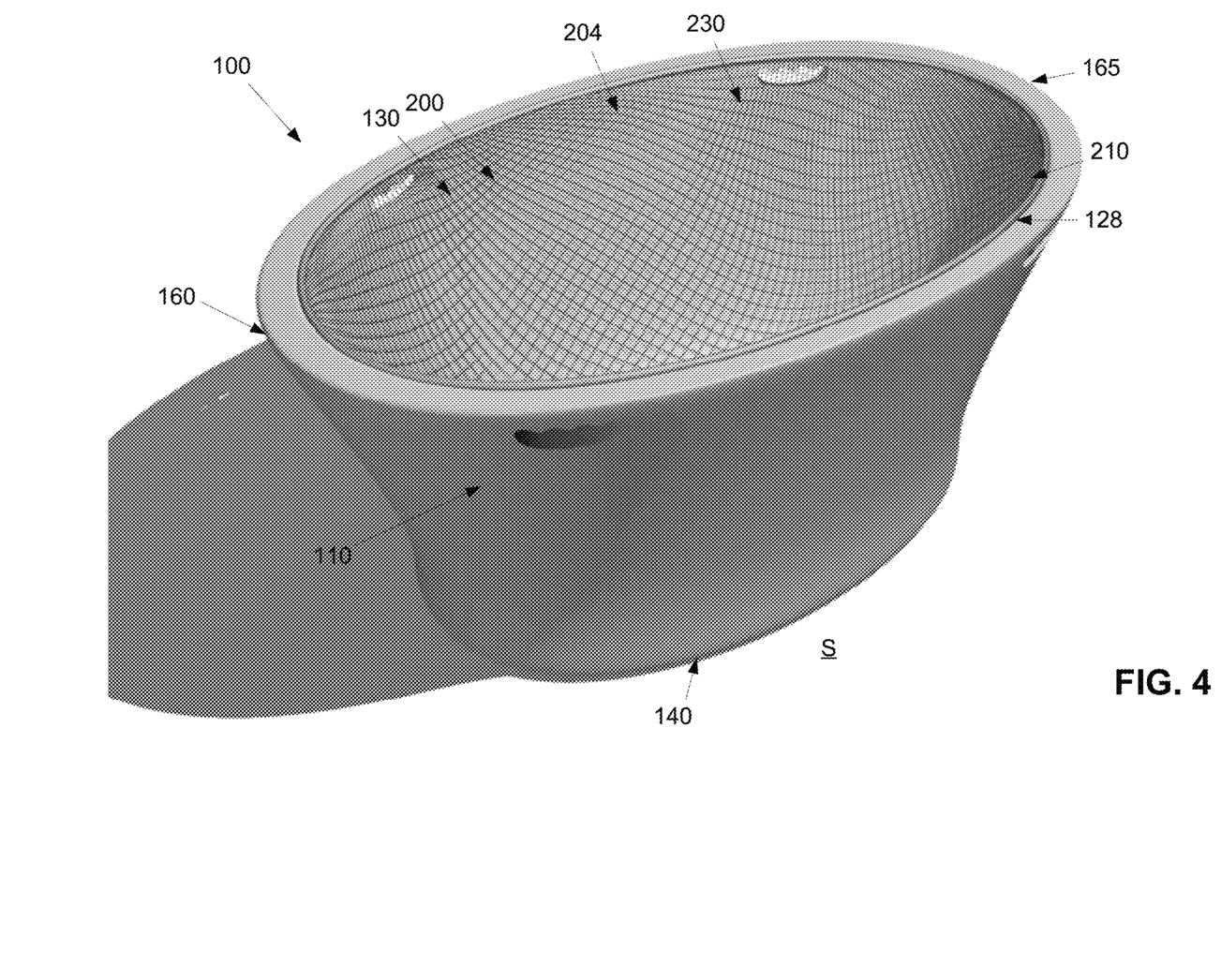
FIG. 4 shows a front perspective view of the trough of FIG. 2 with the insert installed therein.

In FIG. 4, the insert 200 is shown installed or inserted within the basin 102. In this embodiment the insert receptacle 230 substantially conforms to the basin receptacle 130. In other embodiments, the receptacle 230 may be provided in any desirable shape. For example, if the insert 200 is intended to selectively cover the basin receptacle, the insert 200 may include a small or minimal insert receptacle 230. In still other embodiments, the insert 200 may be flat or inverted, such that the insert 200 does not include an insert receptacle 230 or includes an inverted insert receptacle 230 (i.e. a dome). That being said, in preferred embodiments, the insert receptacle 230 conforms to the basin receptacle 130 in order to maximize the size of the basin receptacle 130 *t* when the insert 200 is installed therein. For example, if the insert 200 is configured as a sieve and the basin 102 is configured to hold water for animals, the insert 200 may conform to the inner wall 120 of the basin 102 such that it rests on the inner wall 120 and provides animals access to the entirety of, or substantially all of, the receptacle 130.

Regardless of the size or inclusion of an insert receptacle 230, the upper edge 210 is preferably configured to sit flush on the basin 102. In the embodiment shown in FIG. 4, the upper edge 210 of the insert 200 is sitting atop of an upper lip 128 and is flush with the inner wall 120. Consequently, if the insert 200 is left installed or inserted in the basin 102 for extended periods of time, there may be minimal space between the insert 200 and the inner wall 120 for buildup to accumulate or algae to grow.

Now turning to FIGS. 5A and 5B, sectional views of the water trough 100 of FIG. 2, taken along line 5-5 of FIG. 2 are shown. The embodiments shown in FIGS. 5A and 5B are substantially identical, except the trough in FIG. 5A includes a first embodiment of a heating element 190 and the trough in FIG. 5B includes a second embodiment of a heating element 190, as is explained in further detail below.

In FIGS. 5A and 5B, the sectional views illustrate that the outer wall 110 includes an inner surface 112 and an outer surface 114, the inner wall 120 includes an inner surface 122 and an outer surface 124. Together with the bottom 140 and top wall 134, the inner surfaces 112 and 122 of the outer wall 110 and the inner wall 120 collectively define a housing 150 formed substantially beneath and partially around the basin receptacle 130. In this configuration, the inner wall 120 extends between the housing 150 and the basin receptacle 130 and, thus, may prevent contents stored in one of housing 150 or receptacle 130 from moving to the other. In essence, the inner wall 120 may divide the basin 102 into two sections and, thus, in some embodiments the basin receptacle 130 may be referred to as a first portion of the basin 102 and the housing 150 may referred to as a second portion of the basin 102. Regardless, since the housing 150 is separated from the basin receptacle 130, the housing 150 is configured to house various elements, features or components of the trough 100 without exposing them to items introduced to or stored within the basin receptacle 130.

Most notably, the housing 150 may be configured to either house or serve as a ballast compartment 152. In some embodiments, such as the embodiment shown in FIG. 5, the housing 150 extends around and underneath the basin receptacle 130 and, thus, the housing 150 may simply serve as the ballast compartment 152. However, in other embodiments, at least a portion of housing 150 may be disposed in a non-ideal location for ballast and, thus, a separate ballast compartment 152 may be included within a portion of the housing 150.

In the depicted embodiment, the ballast compartment 152 extends between the basin receptacle 130 and a support surface S that the basin 102 is disposed on and, thus, when the compartment 152 is filled with a weighted substance it may serve to balance the trough 100. Preferably, the compartment 152 is simply configured to receive a fluid as a weight, such that a user may easily remove the weight when desired, however, in other embodiments the compartment 152 may be filled with any desirable weight. Notably, due to the size of an animal trough, fluid received in compartment 152 may be quite heavy and, thus, providing a compartment 152 that can removably receive a fluid may ensure that the trough can be moved. In the embodiment shown in FIG. 5, the compartment includes an aperture 154 that extends through the outer wall 110 of the basin 102 and a plug 156 configured to selectively seal the aperture 154. Preferably, the aperture 154 is oriented proximate or adjacent the top wall 134, such that if a fluid is introduced into the compartment 150, the compartment may be substantially filled before fluid begins to spill out of the aperture 154, but in other embodiments the aperture 154 (and plug 156) may be disposed in any desirable location. As an example, in FIG. 5, the compartment 152 is filled with a fluid F2 that extends substantially up the sides of basin 102 without spilling out aperture 154.

In addition to a ballast compartment 152, the trough 100 may include a heating element 190. In some embodiments, such as the embodiment shown in FIG. 5B, the heating element may be disposed in and/or extend through the housing 150. For example, the heating element may be a probe-type heating element. However, in other embodiments, the heating element may be disposed within a wall of the basin 102. For example, the heating element may be a mesh-type heating element disposed within the inner wall 120, as illustrated in FIG. 5A. Regardless, the heating element 190 may provide heat to any items disposed in the receptacle 130 and/or the housing 150 without necessarily being in direct contact with any of these items. In some embodiments, the probe-type heating element 190 shown in FIG. 5B may be removable from the basin 102 and, thus, may be provided as an optional feature depending on the climate in which the basin 102 is used. Additionally, a removable probe-type heating element may allow for easy repair or replacement.

If, as shown in FIGS. 5A and 5B, a fluid F1 is disposed in receptacle 130 and a fluid F2 is disposed in housing 150, the heat produced by heating element 190 may serve to heat both fluids F1 and F2, regardless of whether the heating element 190 is disposed within the housing 150, the inner wall 120, or another portion of basin 102. Transmitting heat to fluids F1 and F2 may prevent fluids F1 and F2 from freezing when the trough 100 is disposed in a cold environment. Thus, when fluid F1 is water for animals, water may be continuously provided to animals regardless of the temperature. Similarly, when fluid F2 is used for ballast, fluid F2 may remain in a liquid state such that it remains removable from housing 150 and weight can be removed from trough 100 if the trough 100 needs to be moved or otherwise manipulated in a cold environment.

In the particular embodiment shown in FIG. 5A, the heating element extends substantially along the length of inner wall 120 and receives power from a power element 192. The power element 192 extends through a passageway 116 in the outer wall 110, between an aperture 115 included in the outer surface 114 and an aperture 117 included in the inner surface 112. The portion of the power element 192 extending beyond aperture 115 extends outside the trough 100 such that a user may connect the power element 192 to a power source. The portion of the power element 192 extending beyond aperture 117 extends through housing 150 and into an aperture 123 included in the inner surface 122 of the inner wall 120.

The aforementioned configuration of the power element 192 and heating element 190 included in the embodiment of FIG. 5A enables power to be drawn from an external power source to the heating element 190 without exposing any electrical elements to items stored within receptacle 130. Thus, when the receptacle 130 is filled with a fluid F1, such as water for animals, there is no risk that the fluid F1 in the receptacle 130 includes an electric current that could harm an animal. In other words, the receptacle 130 is electrically insulated. However, in the aforementioned configuration, the power element 192 extends through the housing 150 and in some embodiments the housing 150 may be filled with a fluid F2. Consequently, the power element 192 is preferably sealed in a waterproof casing and any apertures through which the power element 192 passes are also preferably sealed. Additionally, the power element may pass through the housing 150 at or above the height of the plug, such that gravity and fluid flow principles minimize the exposure of power element 192 to a fluid F2.

By comparison, in the particular embodiment shown in FIG. 5B, the heating element 190 extends substantially through the housing 150 and receives power from a power element that extends through the outer wall 110 between apertures 115 and 117 and away from the trough 100 such that a user may connect the power element 192 to a power source. Although the heating element 190 may be in direct contact with the fluid F2, the heating element is water-tight, sealed, or otherwise configured to prevent electricity from passing to fluid F2 (or fluid F1). Consequently, when the receptacle 130 is filled with a fluid F1, such as water for animals, there is again no risk that the fluid F1 in the receptacle 130 includes an electric current that could harm an animal. In other words, the receptacle 130 is also electrically insulated in the embodiment illustrated in FIG. 5B.

Figure 6:
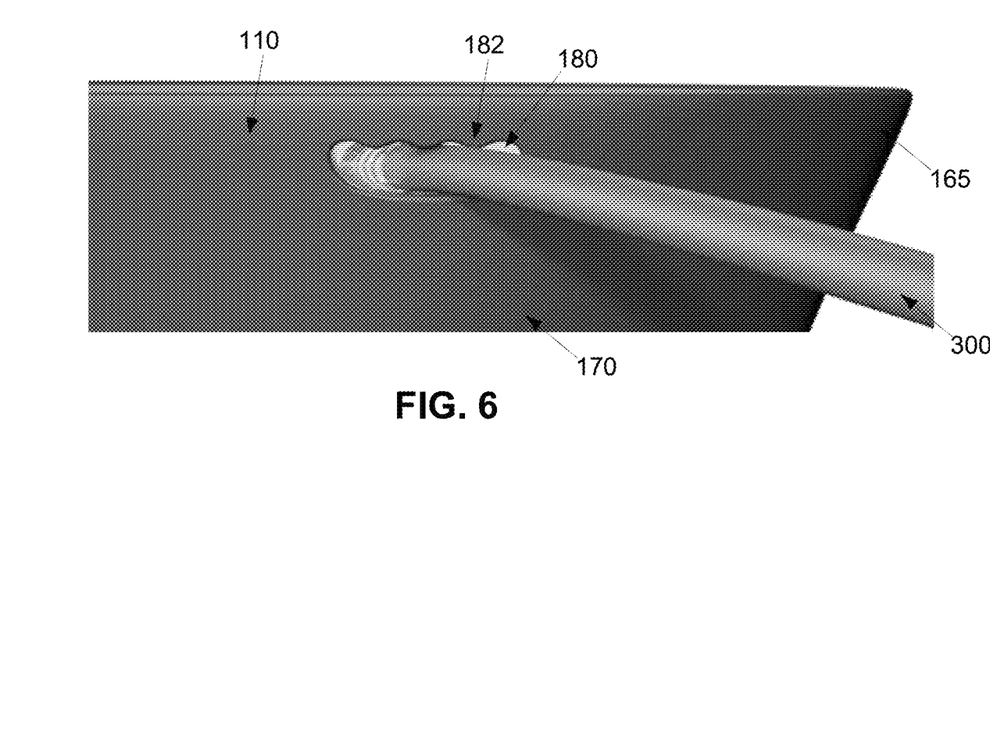
FIG. 6 shows a front perspective view of a handle included in the water trough of FIG. 2.
Like reference numerals have been used to identify like elements throughout this disclosure.

Now turning to FIG. 6, a portion of the basin 102 that includes a handle 180 is shown. As can be seen, in this embodiment, the handle 180 is an opening that extends through both the inner wall 120 and the outer wall 110; however, in other embodiments the handle 180 may be coupled to walls 110, 120 in any manner. The handle 180 also includes an ergonomic grip portion 182 that may allow a user to comfortably and easily grip the basin 102, perhaps for moving or emptying the basin 102. Moreover, in some embodiments, the grip portion 182 may be sized so that a hose 300 or other such fluid conduit may be temporarily secured in the handle 180 when the basin 102 is being filled with a fluid, such as fluid F1. Thus, a user need not stand over the trough 100 for the entire time it takes to fill the basin, which may be a considerable amount of time if the basin is considerably sized. For example, in some embodiments of the present trough 100, the receptacle 130 may have a capacity of approximately 70 gallons while in other embodiments the receptacle 130 may have a capacity of approximately 100 gallons.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the improved trough of the present invention, or portions thereof may be fabricated from any suitable material or combination of materials, such as plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof. As an example, the trough of the present invention may be molded from plastic with any desirable features, such as handles 180, molded or co-molded therein.

Finally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

What is claimed:

1. An animal trough comprising:
    an inner wall with an inner surface and an elliptic, arcuate outer surface;
    an outer wall with an inner surface and outer surface;
    a compartment configured to removably receive a first fluid and formed between the inner surface of the inner wall and the inner surface of the outer wall;
    a receptacle with an inverted, elliptic dome-shape that is configured to receive a second fluid and that is defined by the elliptic, arcuate outer surface of the inner wall, such that the receptacle is smooth and the inner wall separates the compartment from the receptacle such that the first fluid is separated from the second fluid; and
    an insert including an insert outer surface shaped to substantially conform to the elliptic, arcuate outer surface of the inner wall when the insert is removably nested within the receptacle, the insert being configured to remove debris from the receptacle when removed from the receptacle.

2. The animal trough of claim 1, wherein the insert is a sieve.

3. The animal trough of claim 1, further comprising:
    a heating element configured to transfer heat to at least the second fluid.

4. The animal trough of claim 3, wherein the heating element is a probe-style heating element that is removable from the compartment.

5. The animal trough of claim 1, wherein the compartment comprises:
    a ballast compartment configured to receive the first fluid and maintain the animal trough in an upright position.

6. An animal trough comprising:
    an annular outer wall extending from a first end to a second end;
    an annular inner wall extending from the first end to the second end;

a top that extends between the inner wall and the outer wall;

a bottom wall that extends between the inner wall and the outer wall, wherein the inner wall defines a an elliptic, arcuate basin receptacle with an open top, and the bottom wall, the top, the outer wall, and the inner wall define a housing;

an insert including an insert outer surface shaped to substantially conform to the elliptic, arcuate basin receptacle when the insert is removably nested within the elliptic, arcuate basin receptacle, the insert being configured to remove debris from the elliptic, arcuate basin receptacle when the insert is removed from the elliptic, arcuate basin receptacle; and a heating element configured to transfer heat to the housing and the elliptic, arcuate basin receptacle.

7. The animal trough of claim 6, wherein the housing further comprises:

a sealable aperture and, when the aperture is sealed, the housing is sealed.

8. The animal trough of claim 7, wherein the aperture is disposed proximate the top.

9. The animal trough of claim 8, wherein the heating element receives power from a power element disposed between the aperture and the top to minimize exposure of the power element to a fluid disposed in the housing.

10. The animal trough of claim 6, wherein the housing is configured to receive a fluid and the heating element is configured to transfer heat to the fluid, such that the fluid remains in a fluid state and can be removed from the housing in a cold environment.

11. The animal trough of claim 6, wherein the elliptic, arcuate basin receptacle is electrically insulated from a power element providing power to the heating element, such that a fluid disposed in the elliptic, arcuate basin receptacle does not include an electric current.

12. An animal trough including:
a basin comprising:
a first portion including a smooth surface and an open top, the first portion being elliptic and arcuate and being configured to receive a first fluid; and
a second portion disposed beneath and separated from the first portion, the second portion being configured to receive a second fluid; and
an insert including an insert outer surface configured to substantially conform to the elliptic, arcuate first portion when the insert is removably nested within the elliptic, arcuate first portion, the insert being configured to remove debris from the elliptic, arcuate first portion when the insert is removed from the elliptic, arcuate first portion.

13. The animal trough of claim 12, wherein the basin further comprises:
an inner wall with an outer surface that defines the smooth surface of the first portion and an inner surface that defines a wall of the second portion.

14. The animal trough of claim 12, wherein the basin further comprises:
an outer wall with a smooth outer surface.

15. The animal trough of claim 14, wherein an upper portion of the outer surface of the outer wall is tapered and a lower portion of the outer surface of the outer wall has a constant width, such that the basin includes a base configured to stably support the basin on a support surface.

16. The animal trough of claim 12, further comprising handles configured to temporarily secure a fluid conduit that is introducing the first fluid to the first portion.

17. The animal trough of claim 12, further comprising:
a heating element disposed between the first portion and the second portion, and configured to transfer heat to both the first fluid and the second fluid.

18. The animal trough of claim 12, wherein the first portion has a capacity between approximately 70 gallons and approximately 100 gallons.

* * * * *